(12) United States Patent
Lipson et al.

(10) Patent No.: US 10,281,581 B2
(45) Date of Patent: May 7, 2019

(54) LIDAR WITH OPTICAL COMMUNICATION

(71) Applicant: GM Global Technology Operations LLC, Detroit, MI (US)

(72) Inventors: Ariel Lipson, Tel Aviv (IL); Kobi J. Scheim, Pardess Hanna (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 314 days.

(21) Appl. No.: 15/145,970

(22) Filed: May 4, 2016

(65) Prior Publication Data

US 2016/0327648 A1  Nov. 10, 2016

Related U.S. Application Data

(60) Provisional application No. 62/158,295, filed on May 7, 2015.

(51) Int. Cl.

| H04B 10/00 | (2013.01) |
|---|---|
| G01S 17/88 | (2006.01) |
| H04B 10/112 | (2013.01) |
| G01S 17/74 | (2006.01) |
| H04J 14/00 | (2006.01) |
| G01S 17/66 | (2006.01) |
| G01S 17/89 | (2006.01) |

(52) U.S. Cl.
CPC ............. G01S 17/88 (2013.01); G01S 17/74 (2013.01); H04B 10/1123 (2013.01); *G01S 17/66* (2013.01); *G01S 17/89* (2013.01)

(58) Field of Classification Search
CPC ... H04B 10/11; H04B 10/112; H04B 10/1123; H04B 10/1125; H04B 10/114; H04B 10/1143; H04B 10/118
See application file for complete search history.

(56) References Cited

U.S. PATENT DOCUMENTS

| 2004/0258415 A1* | 12/2004 | Boone ............... H04B 10/1125 398/125 |
| 2014/0347648 A1* | 11/2014 | Roberts .................. G01S 17/06 356/4.01 |

* cited by examiner

*Primary Examiner* — Daniel G Dobson
(74) *Attorney, Agent, or Firm* — Cantor Colburn LLP

(57) ABSTRACT

A communication system on a platform and a method of performing optical communication using an array lidar system comprising a plurality of illuminators on a platform include transmitting beams from a first set of the plurality of illuminators, receiving reflections resulting from the beams to perform target detection, and transmitting modulated optical signals from a second set of the plurality of illuminators. Receiving the modulated optical signals is done to perform the optical communication.

15 Claims, 6 Drawing Sheets

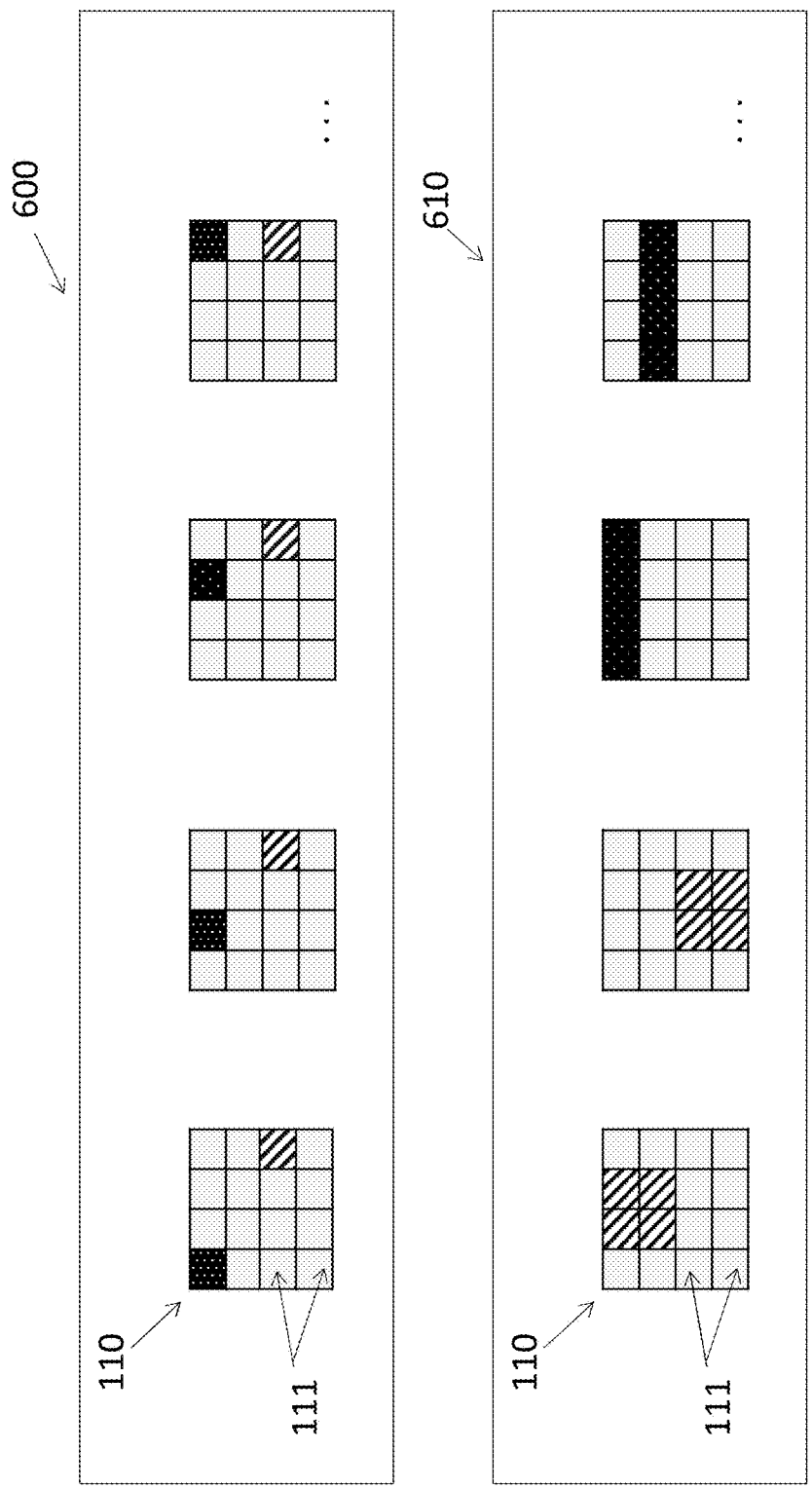

LIDAR WITH OPTICAL COMMUNICATION

CROSS-REFERENCE TO RELATED APPLICATION

This application is a Non-Provisional of U.S. Provisional Application No. 62/158,295 filed May 7, 2015, the disclosure of which is incorporated herein by reference in its entirety.

FIELD OF THE INVENTION

The subject invention relates to lidar with optical communication.

BACKGROUND

Lidar, which may be referred to as light radar or laser array light detection and ranging, refers generally to transmitting light at an object and receiving and processing a resulting reflection. An array of lasers may be used in an array lidar system to obtain reflections from a wider field of view than is possible with a single laser. The array lidar system facilitates scanning and tracking of a target. Additionally, it is desirable to provide communication with the array lidar system.

SUMMARY OF THE INVENTION

According to an exemplary embodiment, a method of performing optical communication using an array lidar system comprising a plurality of illuminators on a platform includes transmitting beams from a first set of the plurality of illuminators; receiving reflections resulting from the beams to perform target detection; transmitting modulated optical signals from a second set of the plurality of illuminators; and receiving the modulated optical signals to perform the optical communication.

According to another embodiment, a communication system on a platform includes an array lidar including a plurality of illuminators, the array lidar configured to transmit beams from a first set of the plurality of illuminators, and transmit modulated optical signals from a second set of the plurality of illuminators to a receiver; and an optical detector configured to receive reflections resulting from the beams to perform target detection.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 6 shows exemplary transmissions by an array lidar according to embodiments.

DESCRIPTION OF THE EMBODIMENTS

As noted above, the array lidar system facilitates scanning and target tracking and other detection and monitoring activities. Embodiments of the systems and methods described herein relate to additionally using the array lidar system for communication. In an exemplary automotive application, the communication may be between a vehicle with an array lidar system and another vehicle, a pedestrian, a pole, or anything else that also includes an array lidar or optical communication system. The scanning-related and communication functions may be conducted serially or concurrently. According to one embodiment, some of the lasers of the array may perform the scanning-related functions while other lasers of the array simultaneously perform communication functions. According to another embodiment, all of the lasers may be involved in scanning-related functions for a period of time and all of the lasers may then be involved in communication functions for another period of time. The wireless communication facilitated by the array lidar system is more secure than communication via a cellular or other traditional wireless networks because the communication is point-to-point. The array lidar system may be used to communicate audio, video, and images at rates of 40 giga bits per second (GBPS), for example. The low latency facilitates safety communication applications. According to alternate embodiments, communication via the array lidar system may be stand-alone or in conjunction with another system. That is, for example, a cellular or other communication network may be used to establish communication that is then transferred to the array lidar system. A communication device may be used to coordinate the communication among array lidar systems. The communication device may coordinate identity information, timing information, and protocol information, for example.

Figure 1:
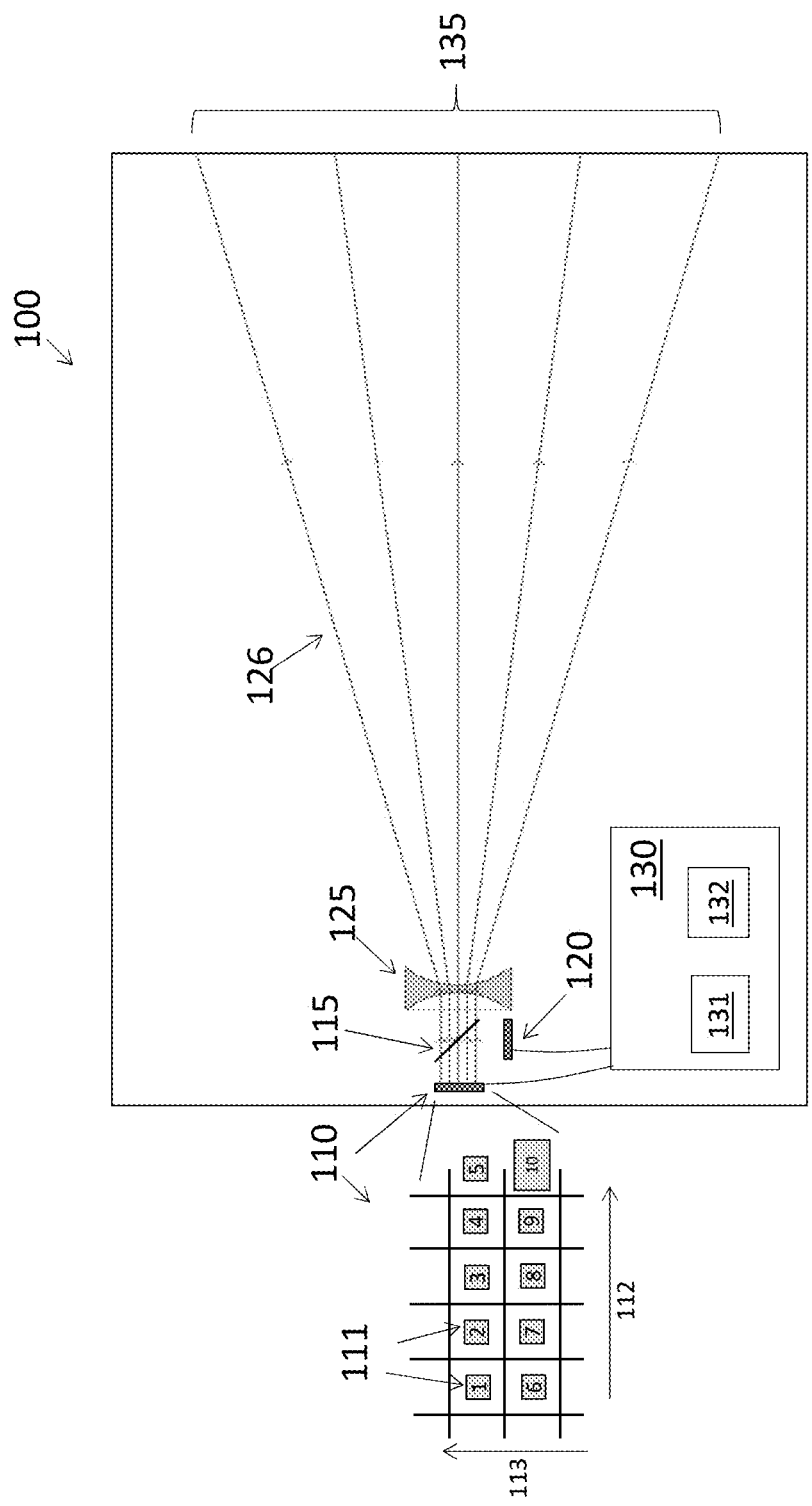
FIG. 1 is a block diagram of an exemplary array lidar system according to embodiments.

FIG. 1 is a block diagram of an exemplary array lidar system 100 according to embodiments. It should be clear that none of the figures herein are to scale and are not intended to convey a limitation on size or relative size. While lasers 111 are specifically discussed as part of the array lidar system 100 for explanatory purposes, other illuminators (e.g., light emitting diodes (LEDs)) may be used, as well. The array lidar 110 refers to an arrangement of two or more lasers 111 in an array such that their transmissions make up a field of view 135. The exemplary array lidar system 110 shown in FIG. 1 includes two rows of five lasers 111. The perspective top-down view illustrating the transmission from the array lidar 110 shows the five transmitted signals 126 (laser beams) resulting from one row of lasers 111. The exemplary array lidar system 100 shown in FIG. 1 includes a semi-permeable mirror 115 that focuses light from each laser 111 of the array lidar 110 through a lens 125. The lens 125 disperses the laser beam transmitted by each of the lasers 111 of the array lidar 110 across the field of view 135. The exemplary array lidar system 100 may include additional known components (e.g., laser diodes) that are well-known and may be used to control the output of one or more of the lasers 111. An optical detector array 120 receives reflections resulting from the transmitted signals 126 of the array lidar 110. According to alternate embodiments, the optical detector array 120 may include a single detector or two or more detectors and may or may not include the same number of detectors as lasers 111 in the array lidar 110. Each of the one or more detectors of the optical detector array 120 receives the reflections resulting from transmission by any of the lasers 111.

A controller or processing system 130 may include one or more processors 131 and one or more memory devices 132 along with other known components in order to control transmission by each of the lasers 111 of the array lidar 110 as well as processing of received reflections by the optical detector array 120 according to embodiments. The processing system 130 may control the typical lidar operation as well as the communication with the array lidar 110. In alternate embodiments, the processing system 130 may be part of the control system of a platform (e.g., vehicle, ship, construction equipment) on which the array lidar system 100 is installed. As FIG. 1 shows, the array lidar 110 may be used to scan the field of view 135 in both azimuth 112 and elevation 113. Further each laser 111 gives a range to a target 410 (FIG. 4) in the field of view 135. Thus, the array lidar 110 can provide a three-dimensional image in which each reflection resulting from each pulse burst 210 emission (FIG. 2) by a laser 111 within the transmitted signal 126 may be considered a pixel in the image. The embodiments detailed below relate to controlling the array lidar 110 to detect and track targets 410 as well as perform communication according to various scenarios.

Figure 2:
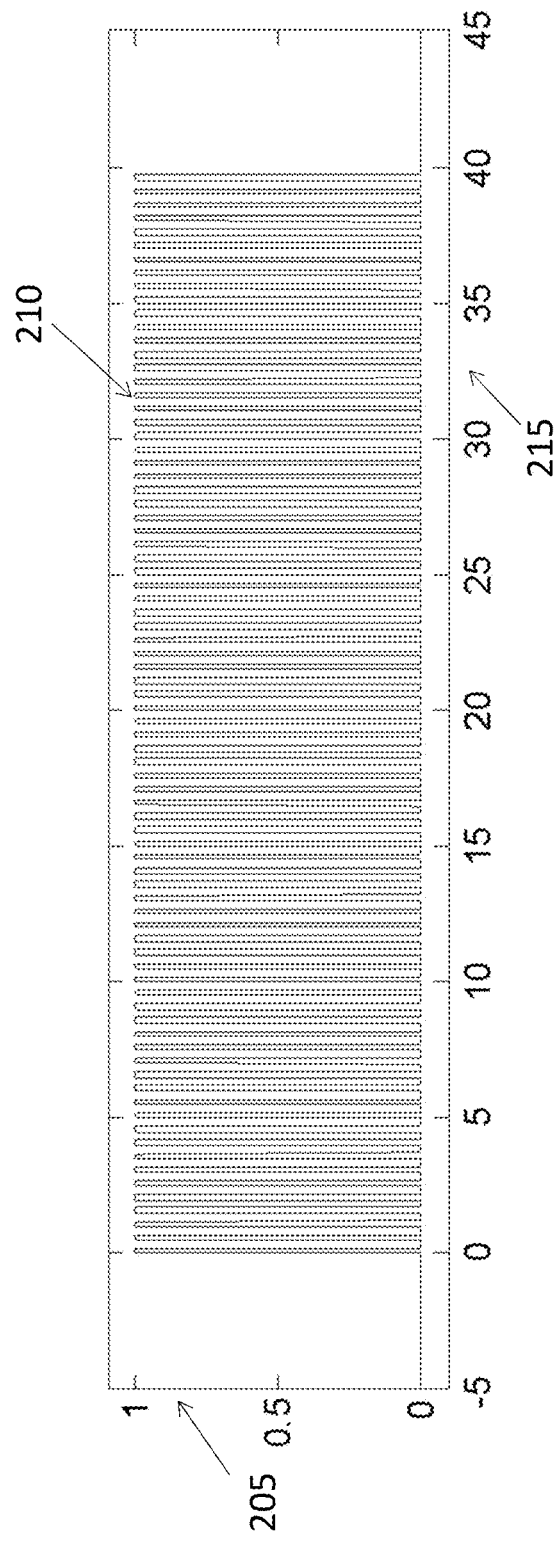
FIG. 2 shows an exemplary pulse burst transmitted by a laser of the array lidar of the array lidar system according to embodiments.
Figure 5:
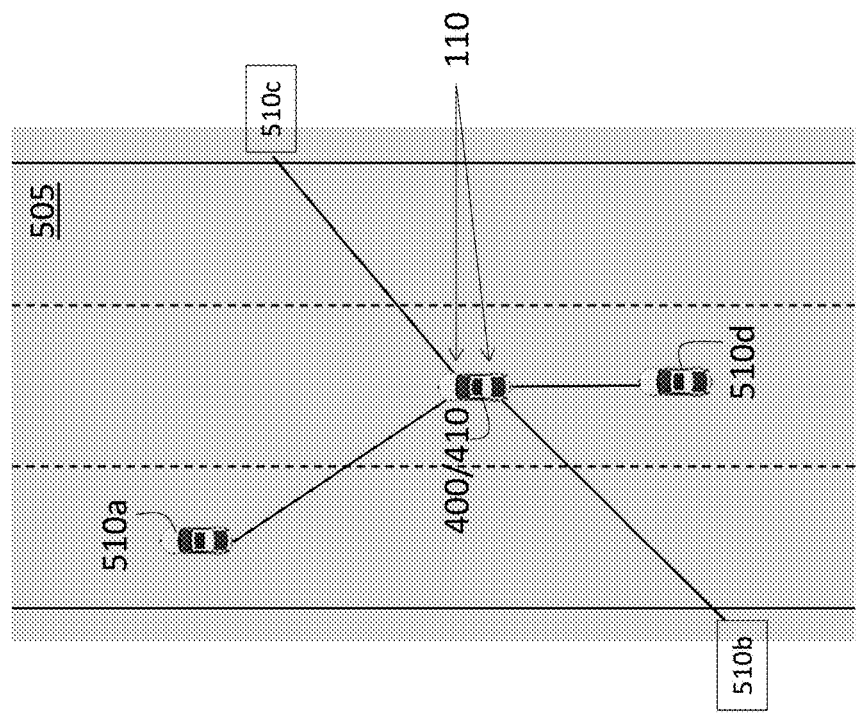
FIG. 5 shows an exemplary scenario in which detection and communication is performed by the array lidar system according to embodiments.

FIG. 2 shows an exemplary pulse burst 210 transmitted by a laser 111 of the array lidar 110 of the array lidar system 100 according to embodiments. The transmit power 205 is indicated as being either on (value of 1) or off (value of 0). Time 215 is shown in milliseconds, for example. The duration of the pulse burst 210 determines the range resolution for detection of a target 510 (FIG. 5). For purposes of target detection, the transmitted pulse bursts 210 are reflected back, and the round-trip time for the pulse bursts 210 is used to determine range, velocity, and direction of the target 510. Because each detector of the optical detector array 120 receives reflections associated with all the lasers 111, a transmission scheme may be selected to facilitate distinguishing the reflections associated with each of the lasers 111 of the array lidar 110. For example, a time divisional multiple access (TDMA) scheme may be used such that each laser 111 transmits at a time offset from the time of transmission by another laser 111. Because each laser 111 of the array lidar 110 transmits in turn, the entire field of view 135 may be scanned over a period of time. In alternate embodiments, two or more lasers 111 may be controlled to transmit concurrently, and the reflections resulting from the transmissions of the two or more lasers 111 may be processed together. Transmissions may be controlled by different patterns of lasers 111 to scan for or track targets 510 as needed.

Figure 3:
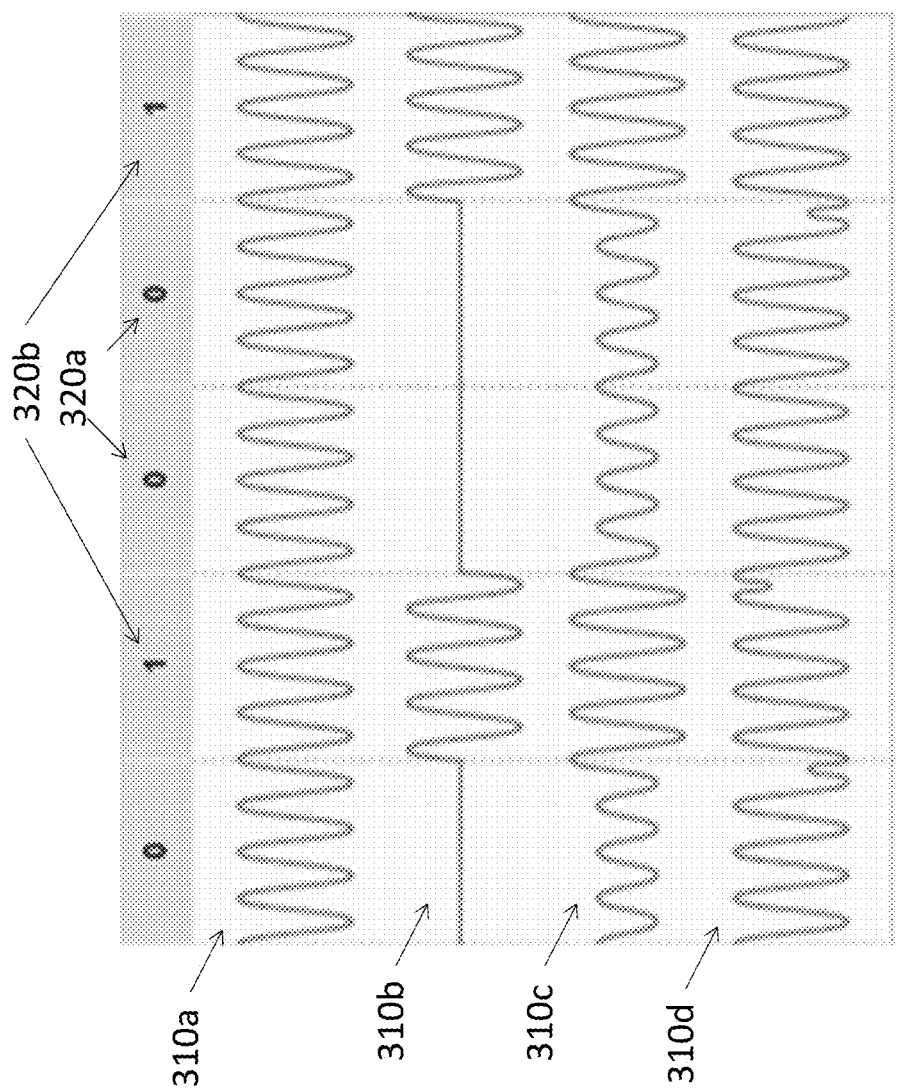
FIG. 3 shows exemplary optical signals used for communication by a laser of the array lidar of the array lidar system according to embodiments.

FIG. 3 shows exemplary optical signals 310 used for communication by a laser 111 of the array lidar 110 of the array lidar system 100 according to embodiments. According to embodiments herein, rather than simply being reflected by a target 510 (FIG. 5), a transmission from one or more of the illuminators (e.g., lasers 111) may be received by an optical detector or detector array 120. The optical detector array 120 that receives communication from a laser 111 may be part of another array lidar system 100 on another platform 400 (FIG. 4) or may be a receive-only system. As discussed further below, a receiving optical detector array 130 may or may not also be a target 510 (FIG. 5) that is being detected or tracked by the array lidar system 100. Because the lasers 111 exhibit uni-directional transmission (rather than multi- or omni-directional transmission), communication between an array lidar system 100 and an optical detector array 120 (on another platform 400) is point-to-point communication via a direct optical link. As such, the communication is more secure than multi- or omni-directional communication, because another receiver that is not targeted by the transmitting array radar system 100 cannot simply intercept the pulse burst 210 by also receiving the transmission. The type of information that may be transmitted by the lasers 111 includes audio, video, and still images, because the data rate is on the order of 40 gigabits per second (GBPS). The communication involves the use of modulated optical signals, and known modulation schemes, as used in radar systems, for example, may be used on an optical carrier signal.

FIG. 3 shows exemplary optical signals 310a through 310d (generally referred to as 310). The modulated optical signals 310b through 310d are obtained through known modulation techniques, and one or more parameters (e.g., amplitude, frequency, phase) may be modulated as needed in similar ways as radio frequency signals. For example, a known laser diode may be coupled to the array lidar 110 to modulate the current driving the illuminator (e.g., laser 111). The optical signal 310a is unmodulated, while optical signal 310b is obtained through on-off keying (OOK). Amplitude shift keying (ASK) is performed on the unmodulated (carrier) optical signal 310a to obtain optical signal 310c, and phase shift keying (PSK) is performed on the carrier signal to obtain optical signal 310d. For the modulated optical signals 310b, 310c, 310d, the code 320 corresponding with each portion of the optical signals 310b through 310d is indicated in FIG. 3. The portion of the optical signals 310b through 310d corresponding with code 320a indicates a "0" and the portion corresponding with code 320b indicates a "1." The optical signals 310 used in communication may have different wavelengths than the pulse bursts 210 used for detection and tracking of targets 510 (FIG. 5).

Figure 4:
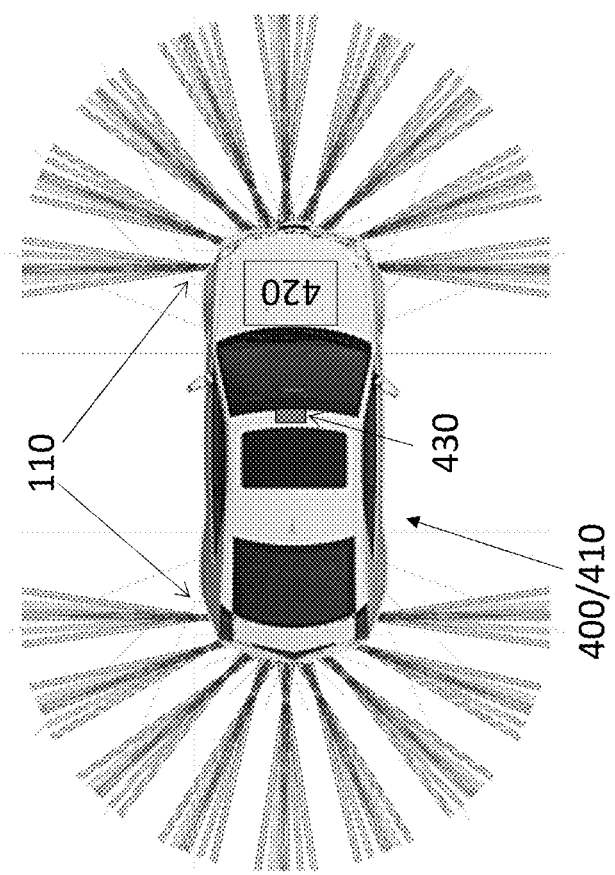
FIG. 4 shows a platform of the array lidar system according an embodiment.

FIG. 4 shows a platform 400 of the array lidar system 100 according an embodiment. The exemplary platform 400 is a vehicle 410. As noted above, in alternate embodiments, the platform 400 may be construction equipment, farm equipment, equipment in an automated manufacturing facility, or water or air-borne, for example. The vehicle 410 is shown with array lidar 110 at both ends, but other arrangements of the array lidar 110 and additional ones of the array lidar 110 are contemplated in additional or alternate embodiments. The array lidar 110 may be controlled by the same or by different processing systems 130. The controller 420 of the vehicle may manage vehicle 410 systems such as collision avoidance and steering control, for example. According to different embodiments, the controller 420 may additionally perform the functions of the processing system(s) 130 of the array lidar system 100 or may be coupled to exchange information with the processing system(s) 130 controlling the array lidars 110. That is, the array lidar systems 100 may be integrated with or separate from the other processors of the platform 400. The vehicle 410 is shown with additional systems 430. Exemplary ones of the auxiliary systems 430 include other sensors such as a camera or radar system, and other communication systems such as a cellular system. The camera may be used for identification of targets 510 (FIG. 5), for example. The auxiliary systems 430 (e.g., the cellular system) may help to establish communication between array lidars 110 on different platforms 400.

FIG. 5 shows an exemplary scenario in which detection and communication is performed by the array lidar system 100 according to embodiments. In the exemplary scenario, the platform 400 for the array lidar system 100 is a vehicle 410. As noted above, other platforms 400 are possible. Two array lidars 110 are shown at either end of the vehicle 410, as in FIG. 4. Again, as noted above, different or additional arrangements of array lidars 110 on the platform 400 are contemplated. Four targets 510a through 510d (collectively referred to as 510) are shown. As FIG. 5 indicates, targets 510a and 510d are vehicles 410 on the same road 505 as the platform 400 and may include array lidar systems 100, as well. Target 510b is a pedestrian who may be carrying or wearing a device with an array lidar system 100 or an optical detector 120 and processor 130. Target 510c is a pole or tower and may also include an array lidar system 100. Each of the targets 510 may be detected by the array lidar 110 of the vehicle 410. Alternately or additionally, each of the targets 510 may communicate with the vehicle 410. Some exemplary scenarios by which detection or communication or both are performed by the vehicle 410 are discussed with reference to FIG. 6. As noted above, an auxiliary system 430 (e.g., camera) may be used to identify a receiving array lidar system 100 (e.g., target 510a with an array lidar system 100) and another auxiliary system 430 (e.g., cellular system) may be used to establish communication. Establishing the communication may include synchronizing timing between the transmit and receive sides and coordinating a protocol or code to be used. Exemplary protocols include known communication protocols such as carrier sense multiple access with collision detection (CSMA-CD) or ALOHA. According to a simple communication scheme, certain optical signals 310 may be associated with certain messages via a look-up table or other association. The speed and security may make communication via the array lidar system 100 preferable after communication has been established via the cellular system.

The type of communication may depend on the target 510 with which the platform 400 is communicating. For example, when a vehicle 410 is communicating with another vehicle 510a or 510d, the communication may be coupled with auto-steering, collision avoidance, or other systems, and messages may be exchanged to ensure that movement of each vehicle 410, 510a, 510d is anticipated by the other. As another example, when a vehicle communicates with a pole or tower 510c, the vehicle 410 may identify itself or otherwise provide information for tracking purposes. When the vehicle 410 communicates with a pedestrian 510b or bicyclist or other moving target 410 that is not necessarily on the road 505. As noted above, the pedestrian 510b (or bicyclist) may not have a complete array lidar system 100 but, instead, only the optical detector array 120 (which may be a single detector) and processor 130. The vehicle 410 may communicate with the pedestrian 510b (e.g., blind pedestrian) to provide information about the presence of the vehicle 410 on the road 505. This may aid the pedestrian 510b in crossing the road 505, for example.

FIG. 6 shows exemplary transmissions by an array lidar 110 according to embodiments. The exemplary array lidar 110 is shown with sixteen lasers 111. Each of the exemplary sets of transmissions 600, 610 shows four instances in time. Lasers 111 (or other types of illuminators) that are operated for detection purposes are indicated by dots, and lasers 111 that are operated for communication purposes are indicated by stripes. In the set of transmissions 600, one laser 111 at a time is used to scan the field of view 135 for detection purposes, as shown. The scan is shown across the top row of the array lidar 110 but may continue, as indicated. Concurrently with the scan, another laser 111 is shown in the transmissions 600 as being operated for communication purposes. The laser 111 used for detection may transmit at a different wavelength than the laser 111 used for communication, as noted above. In the set of transmissions 610, detection or tracking and communication are not done concurrently. In the first two instances shown, communication is performed by a group of four lasers 111 each. In the second two instances shown, detection is performed by a different row of lasers 111 each. As the exemplary transmissions 600, 610 indicate, detection or tracking a target 510, which involves transmitting a pulse burst 210 and processing a resulting reflection, may be done serially or simultaneously with communication via transmission of optical signals 310 using one or more lasers 111 of the array lidar 110.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of performing optical communication using an array lidar system comprising a plurality of illuminators on a platform, the method comprising:
    transmitting beams from a first set of the plurality of illuminators;
    receiving reflections resulting from the beams to perform target detection;
    transmitting modulated optical signals from a second set of the plurality of illuminators, wherein the first set of the plurality of illuminators is a different set of the plurality of illuminators than the second set of the plurality of illuminators; and
    receiving the modulated optical signals to perform the optical communication.

2. The method according to claim 1, wherein the transmitting the beams is performed during a first time period, and the transmitting the modulated optical signals is performed during a second time period, different than the first time period.

3. The method according to claim 1, wherein the transmitting the beams and the transmitting the modulated optical signals is done concurrently.

4. The method according to claim 1, wherein the transmitting the beams is done at a different wavelength than the transmitting the modulated optical signals.

5. The method according to claim 1, further comprising coordinating a protocol for the modulated optical signals based on an auxiliary device on the platform.

6. A communication system on a platform, comprising:
    an array lidar including a plurality of illuminators, the array lidar configured to transmit beams from a first set of the plurality of illuminators, and transmit modulated optical signals from a second set of the plurality of illuminators to a receiver, wherein the first set of the plurality of illuminators and the second set of the plurality of illuminators have no lasers in common; and
    an optical detector configured to receive reflections resulting from the beams to perform target detection.

7. The system according to claim 6, further comprising an auxiliary device on the platform, the auxiliary device configured to coordinate identity information, timing information, or protocol information between the communication system and the receiver.

8. The system according to claim 7, wherein the auxiliary device is a cellular device.

9. The system according to claim 6, wherein the receiver is another optical detector on another platform that is stationary or moving.

10. The system according to claim 6, wherein the optical detector is an array of optical detectors.

11. The system according to claim 6, wherein the first set of the plurality of illuminators and the second set of the plurality of illuminators are operated at different times.

12. The system according to claim 6, wherein the first set of the plurality of illuminators and the second set of the plurality of illuminators are operated concurrently.

13. The system according to claim 6, wherein the beams are at a different wavelength than the modulated optical signals.

14. The system according to claim 6, wherein the platform is a vehicle.

15. A method of performing optical communication using an array lidar system comprising a plurality of illuminators on a platform, the method comprising:

transmitting beams from a first set of the plurality of illuminators;

receiving reflections resulting from the beams to perform target detection;

transmitting modulated optical signals from a second set of the plurality of illuminators, wherein the transmitting the modulated optical signals includes transmitting data alternate to position or range information; and receiving the modulated optical signals to perform the optical communication, wherein the transmitting the data includes transmitting audio, video, or still images.

* * * * *